(12) United States Patent
Greene

(10) Patent No.: US 7,953,094 B1
(45) Date of Patent: May 31, 2011

(54) SYSTEMS AND METHODS FOR ORDER PRESERVING DATA

(75) Inventor: Spencer Greene, Palo Alto, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1647 days.

(21) Appl. No.: 10/358,274

(22) Filed: Feb. 5, 2003

Related U.S. Application Data

(60) Provisional application No. 60/354,208, filed on Feb. 6, 2002.

(51) Int. Cl.
*H04L 12/56* (2006.01)
(52) U.S. Cl. ........ 370/394; 370/412
(58) Field of Classification Search ........ 370/394, 370/412, 413, 417
See application file for complete search history.

(56) References Cited

U.S. PATENT DOCUMENTS

| | | | |
|---|---|---|---|
| 6,246,684 B1 * | 6/2001 | Chapman et al. | 370/394 |
| 6,389,419 B1 | 5/2002 | Wong et al. | 707/7 |
| 6,477,168 B1 * | 11/2002 | Delp et al. | 370/395.4 |
| 6,600,741 B1 | 7/2003 | Chrin et al. | 370/375 |
| 6,788,686 B1 * | 9/2004 | Khotimsky et al. | 370/394 |
| 6,816,492 B1 * | 11/2004 | Turner et al. | 370/394 |
| 6,876,952 B1 * | 4/2005 | Kappler et al. | 702/187 |

OTHER PUBLICATIONS

U.S. Appl. No. 10/417,196, filed Apr. 17, 2003; Spencer Greene; Systems and Methods for Processing Any-to-Any Transmissions; 35 pages.

* cited by examiner

*Primary Examiner* — Pankaj Kumar
*Assistant Examiner* — Marcus R Smith
(74) *Attorney, Agent, or Firm* — Harrity & Harrity, LLP

(57) ABSTRACT

A data processing system includes an input circuit, a plurality of processing paths and an output circuit. The input circuit receives blocks of data on a plurality of data streams and distributes the blocks of data to the plurality of processing paths. The plurality of processing paths receive and process the distributed blocks of data. The output circuit selectively queues and dequeues the processed blocks of data based on a determined maximum differential delay among each of the processing paths and transmits the processed blocks of data.

13 Claims, 9 Drawing Sheets

SYSTEMS AND METHODS FOR ORDER PRESERVING DATA

RELATED APPLICATIONS

This application claims priority under 35 U.S.C. §119 based on U.S. Provisional Application No. 60/354,208, filed Feb. 6, 2002, the disclosure of which is incorporated herein by reference.

BACKGROUND OF THE INVENTION

A. Field of the Invention

The present invention relates generally to data processing systems and, more particularly, to systems and methods for preserving the order of blocks of data processed by multiple processing paths in a data processing system.

B. Description of Related Art

In a data processing or communications system that must deliver high throughput in processing or communicating a stream of data, a conventional point-to-point approach is to provide n independent paths and distribute sub-streams of the data down each of the n paths. After processing by each of the n processing paths, the sub-streams are recombined to create an output stream. A problem that arises using this technique is that the different processing paths may have different delays. As a result, if a first block of data (e.g., a packet or cell) is sent down a first path at time $t_1$ and a second block of data is sent down a second path at time $t_2 > t_1$, the second block of data may nonetheless finish being processed before the first. Therefore, if nothing is done to correct for this differential delay, the recombined stream of data will be out-of-order relative to the input stream. Out-of-order blocks of data can be problematic in a number of data processing applications.

Out-of-order blocks of data are particularly difficult to prevent when there are R input streams, each connected to n processing paths, each of which is further connected to S output streams. In this "any-to-any" situation, different blocks of data from an input stream can be destined for different output streams. The blocks of data of each input stream are, thus, distributed across the processing paths and then concentrated back to the desired output stream. There are well-known algorithms for restoring order to mis-ordered streams at recombination time, based on attaching sequence numbers to consecutive blocks at input, and sorting blocks to restore consecutive sequence numbers on output. However, in the any-to-any application, a given output will not receive all sequence numbers from a given input, making the standard sorting algorithms impractical.

Therefore, there exists a need for systems and methods that preserve the order of blocks of data in data streams that have been distributed across multiple paths in a data processing system.

SUMMARY OF THE INVENTION

Systems and methods, consistent with the present invention, address this and other needs by providing mechanisms for queuing packets received in a first order from multiple parallel packet processors and re-ordering the queued packets in accordance with a determined maximum differential delay between each of the packet processors.

In accordance with the purpose of the invention as embodied and broadly described herein, a method for preserving the order of blocks of data in multiple data streams transmitted across multiple processing paths includes receiving the blocks of data on the multiple data streams; distributing the blocks of data to the multiple processing paths; receiving the blocks of data processed by the multiple processing paths; ordering the processed blocks of data based on a determined maximum differential processing time among the multiple processing paths; and transmitting the ordered blocks of data on outgoing data streams.

In another implementation consistent with the present invention, a method for preserving the order of blocks of data in multiple data streams processed by multiple processing paths includes receiving the blocks of data on the multiple data streams; distributing the blocks of data to the multiple processing paths; processing, by the multiple processing paths, the blocks of data; selectively queuing and dequeuing the processed blocks of data based on a determined maximum differential delay among each of the processing paths; and transmitting the dequeued blocks of data.

In yet another implementation consistent with the present invention, a method for preserving the order of data blocks in data streams processed by multiple processing paths includes receiving the data blocks on the multiple data streams, the data blocks arriving in a first order; distributing the data blocks to the multiple processing paths; processing, by the multiple processing paths, the data blocks; receiving the processed data blocks from the multiple processing paths, the data blocks arriving in a second order; queuing each of the data blocks; and dequeuing each of the queued data blocks in the first order based on each data block's time of receipt from the multiple processing paths and a determined maximum differential delay time among the multiple processing paths.

In a further implementation consistent with the present invention, a method for preserving the order of packets in multiple data streams received at a data processing system includes receiving the blocks of data on the multiple data streams, the blocks of data being received in a first order; distributing the blocks of data to multiple processing paths; processing, on each of the multiple processing paths, the blocks of data; receiving the blocks of data from the multiple processing paths, the blocks of data being received in a second order; arranging the processed blocks of data in the first order based on a determined maximum differential delay among the multiple processing paths; and transmitting the arranged packets.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Systems and methods, consistent with the present invention, provide mechanisms for queuing blocks of data received in a first order from multiple processing paths and re-ordering the queued blocks of data in accordance with a determined maximum differential delay between each of the processing paths.

Exemplary Order-Restoring Data Processing System

Figure 1:
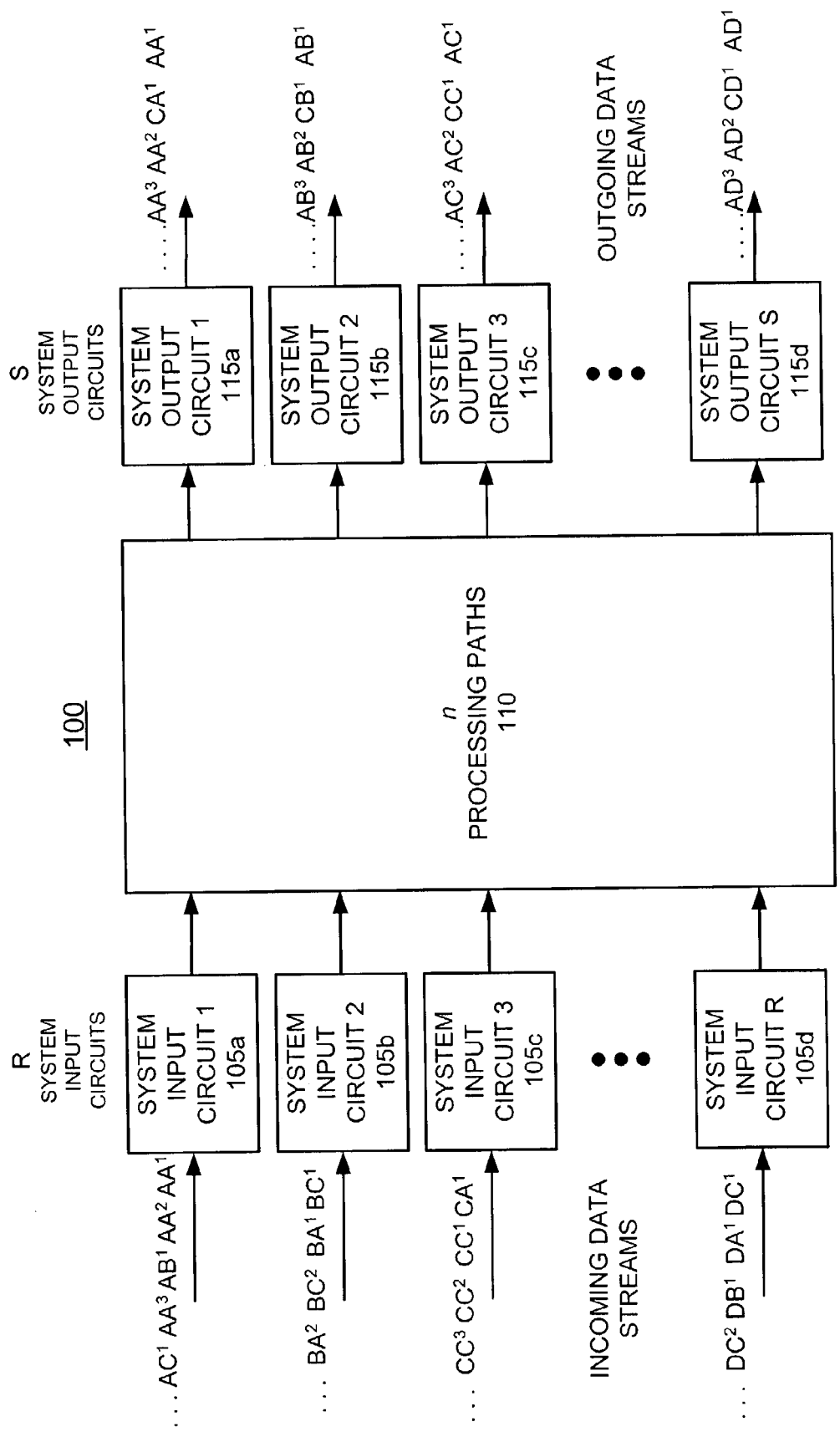
FIG. 1 is a diagram of an exemplary data processing system consistent with the present invention.

FIG. 1 is a diagram of an exemplary data processing system 100 that restores the order of data blocks sent across multiple processing paths in a manner consistent with the present invention. Data processing system 100 may include R system input circuits 105a-105d, n processing paths 110, and S system output circuits 115a-115d. Each system input circuit 105 may include circuitry for receiving and processing a stream of data blocks. These data blocks may include, for example, packets, cells, fragments of packets or cells, or other types of encapsulated data. A data stream may include multiple blocks of data received at a single system input circuit 105. For example, as shown in FIG. 1, system input circuit 1 105a may receive data blocks $AC^1$ and $AA^3$, where the letters signify a source, destination pair. $AC^1$ represents a first data block from system input circuit 1 105a to system output circuit 3 115c. $AA^3$ represents a first data block from system input circuit 1 105a to system output circuit 1 115a. In an any-to-any application, every data block from the same source to the same destination must be kept in order. At each system output circuit 115, the relative output of data blocks from different sources (e.g., AA vs. BA vs. CA vs. DA) is not significant. However, all data blocks from the same source to the same destination (e.g., all AA or all BA) should be in numerical order relative to each other.

Processing paths 110 may include any number of devices that may independently process blocks of data received from any one of system input circuits 105. Such devices may be connected in series and/or parallel and may include multiple processors, switch fabrics, and/or packet routers. Each system output circuit 115 may include circuitry for re-ordering blocks of data received from the n processing paths 110 and outputting the re-ordered blocks of data as an outgoing data stream.

Exemplary System Input Circuit

Figure 2:
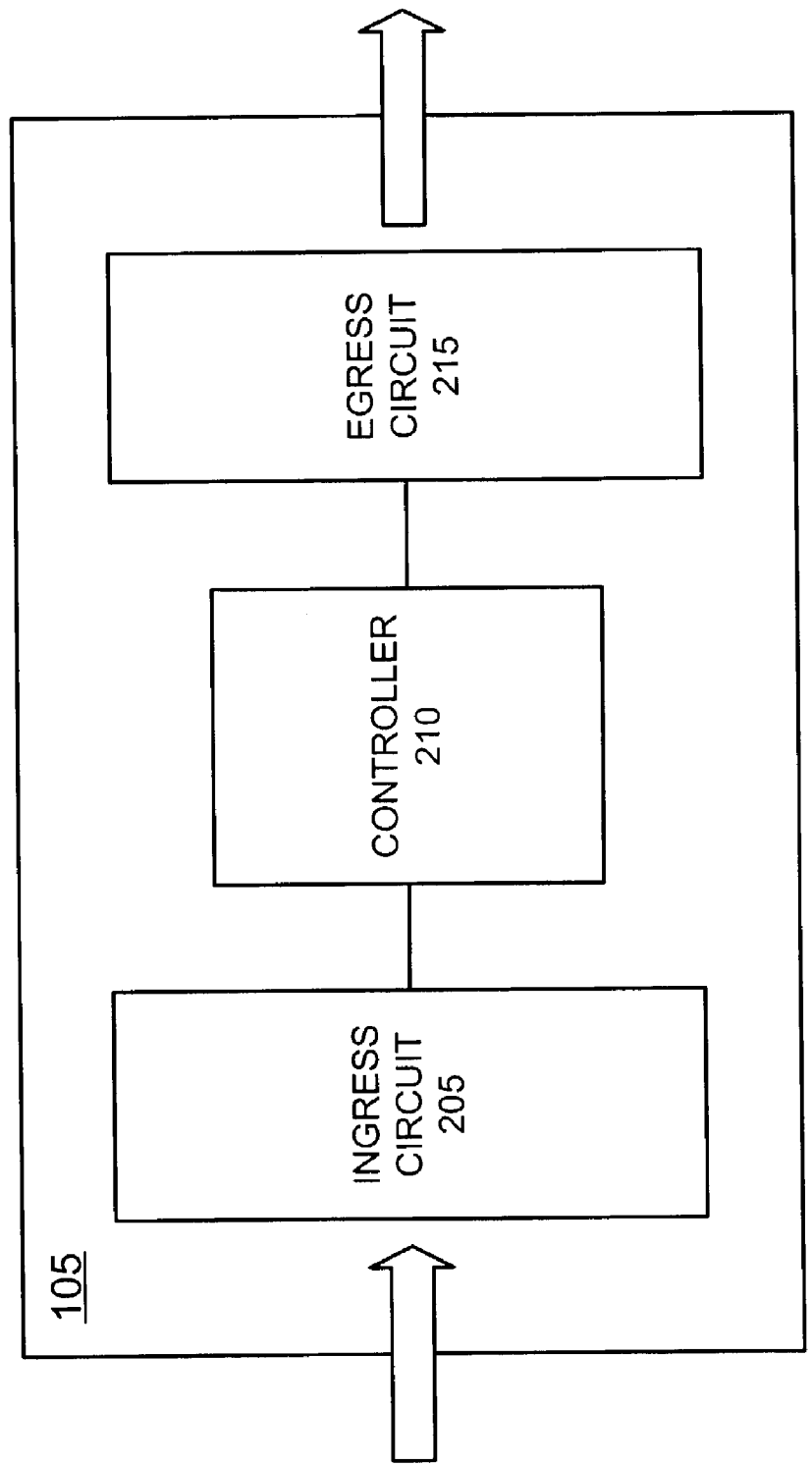
FIG. 2 is an exemplary diagram of a system input circuit consistent with the present invention.

FIG. 2 illustrates exemplary components of a system input circuit 105, consistent with the present invention. System input circuit 105 may include an ingress circuit 205, a controller 210, and an egress circuit 215. Ingress circuit 205 may include conventional circuitry for receiving and buffering an incoming data stream (e.g., a data stream including data blocks AA, AB, AC, etc.) and transferring the data blocks of the incoming data streams to controller 210. Controller 210 may include a conventional processing device and may process the data blocks received at ingress circuit 205. Egress circuit 215 may include conventional circuitry for receiving blocks of data from controller 210 and for transmitting the data blocks across the n processing paths 110. Egress circuit 215 may transmit the data blocks across the n processing paths 110 in accordance with conventional data load management schemes. For example, egress circuit 215 may use a conventional load-balancing scheme when transmitting data blocks across the n processing paths 110.

Exemplary System Output Circuit

Figure 3:
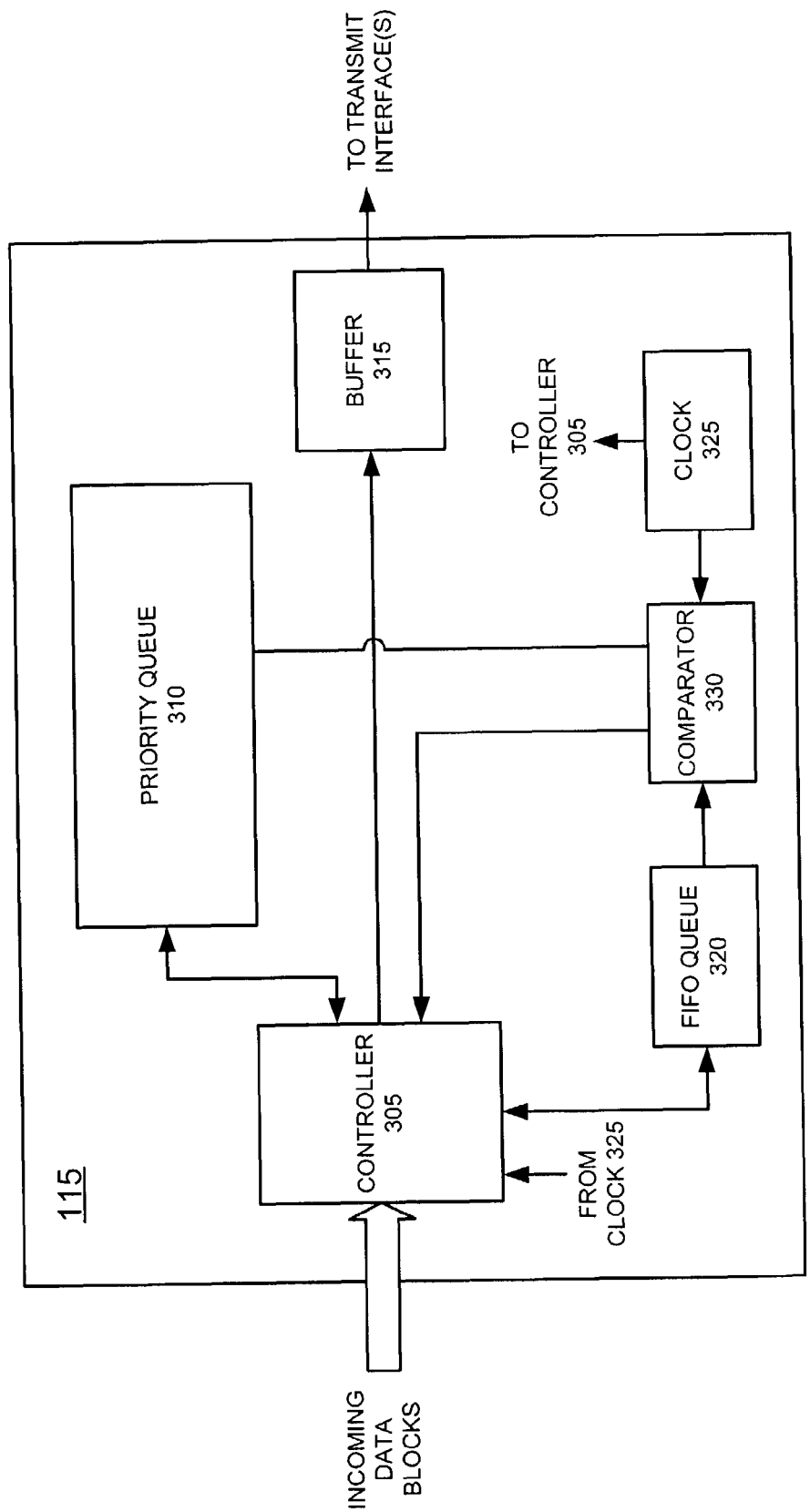
FIG. 3 is an exemplary diagram of a system output circuit consistent with the present invention.

FIG. 3 illustrates exemplary components of a system output circuit 115 consistent with the present invention. System output circuit 115 may include a controller 305, a priority queue 310, a buffer 315, a First-In-First-Out (FIFO) queue 320, a clock 325, and a comparator 330. Controller 305 may include a conventional processing device and may process the blocks of data received at system output circuit 115. Buffer 315 and FIFO queue 320 may reside in memory of one or more conventional memory devices. Such memory devices may include small-capacity storage devices, such as registers or Random Access Memory (RAM) circuits, or large-capacity storage devices, such as magnetic and/or optical recording mediums and their corresponding drives. Buffer 315 may store each block of data received by controller 305. FIFO queue 320 may store a stream number and a time stamp 2-tuple corresponding to each block of data received at controller 305.

Figure 4:
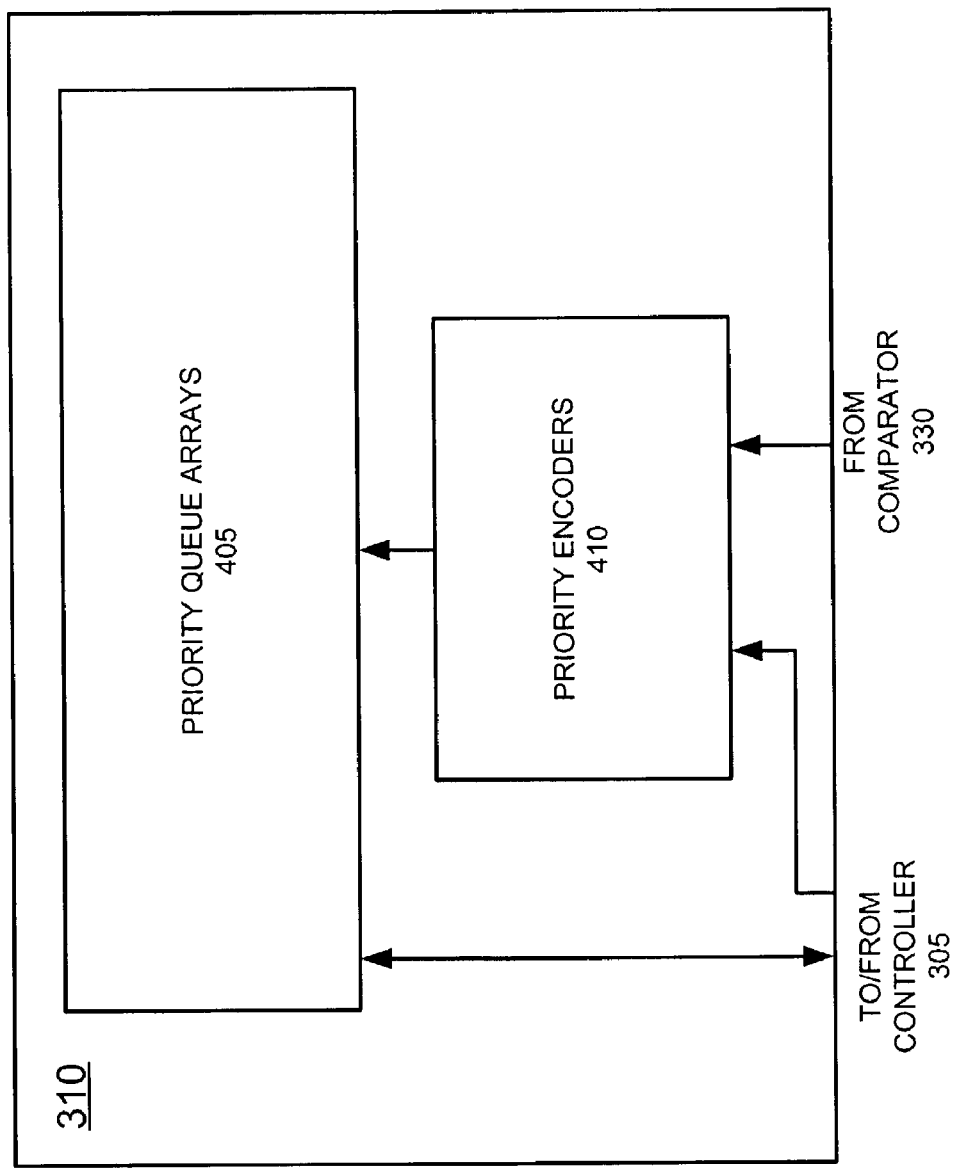
FIG. 4 is an exemplary diagram of the priority queue of FIG. 3 according to an implementation consistent with the present invention.

As illustrated in FIG. 4, priority queue 310 may include priority queue arrays 405 and priority encoders 410. Priority queue arrays 405 may include R arrays (not shown), with each array corresponding to a specific system input circuit 105. Each of the R arrays may store pointers to blocks of data in buffer 315 that were received from a corresponding system input circuit 105. Priority encoders 410 may include R priority encoders, each associated with a single array of priority queue arrays 405. Each priority encoder may select a smallest available sequence number, in a round-robin sense, for retrieving a pointer stored in a corresponding array of priority queue arrays 405.

Figure 5:
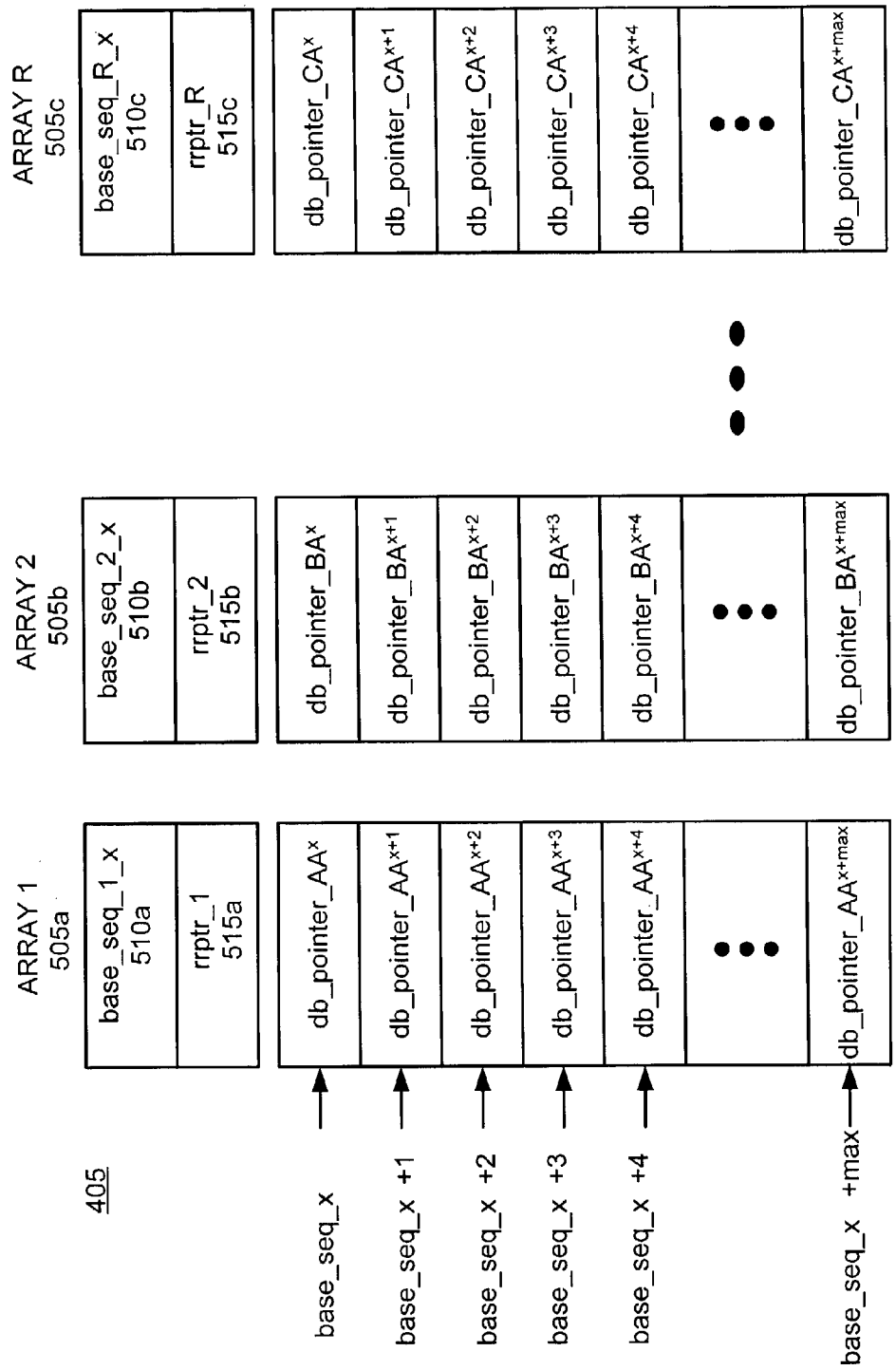
FIG. 5 is an exemplary diagram of the priority queue arrays of FIG. 4 according to an implementation consistent with the present invention.

FIG. 5 illustrates an exemplary diagram of the R arrays of priority queue arrays 405. Each array 505 may be assigned to an incoming data stream received by a system input circuit 105. For example, array 1 505a may be assigned to an incoming data stream received at system input circuit 1 105a and array R 505c may be assigned to an incoming data stream received at system input circuit R 105d. Each array may store data block pointers (db_pointer) to locations in buffer 315 where controller 305 stores fixed or variable-length data blocks for the incoming data stream assigned to an array. Each data block pointer can be stored in an array in a location corresponding to the sequence number that was received with the corresponding data block. For example, as shown in FIG. 5, pointers (dbpointer_$AA^x$, ..., dbpointer_$A^{x+max}$) in array 1 505a are stored in sequential order according to corresponding data block sequence numbers (e.g., base_seq_x through base_seq_x+max). Each array 505 may maintain a "window" of sequence numbers spanning the sequence numbers between a base sequence array entry 510 (base_seq_x) and a sequence number specified by a maximum value (max) added to the base sequence array entry 510 (base_seq_x+max). The data block pointers stored in the array, thus, correspond to the sequence numbers from base_seq_x to base_seq_x+max. Each array 505 may additionally include a round robin pointer 515 (rrptr) that indicates a next candidate sequence number, as determined by a corresponding priority encoder of priority encoders 410, for selecting a data block pointer from the array with which a data block may be retrieved from buffer 315.

Returning to FIG. 3, clock 325 may include conventional circuitry for maintaining a current time $t_{current}$. Comparator 330 may include conventional circuitry for receiving the current time ($t_{current}$) from clock 325 and comparing the current time with a time stamp ($t_{timestamp}$) stored in FIFO queue 320. If the comparison indicates that $t_{current}$ is greater than a sum of $t_{timestamp}$ and a value maxd, then comparator 330 may send a signal to a priority encoder of priority encoders 410 to select a smallest sequence number in a round robin fashion. The value maxd represents a known, or estimated, maximum differential delay among the n processing paths 110. Using an appropriate round robin pointer 515, controller 305 retrieves a data block pointer from a corresponding array 505. Controller 305 uses the retrieved data block pointer to further retrieve a data block from buffer 315 for subsequent transmission.

Exemplary FIFO Queue

Figure 6:
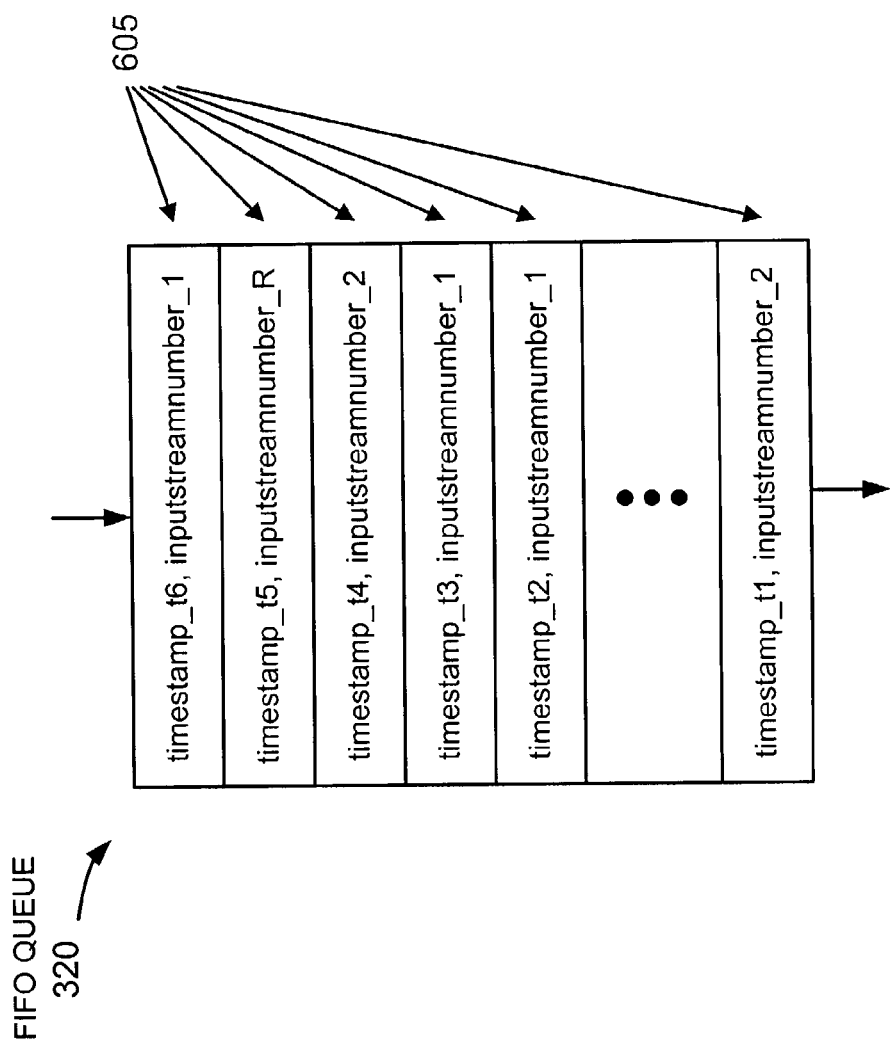
FIG. 6 is an exemplary diagram of the FIFO queue of FIG. 3 according to an implementation consistent with the present invention.

FIG. 6 is an exemplary diagram of a FIFO queue 320. Each memory location in FIFO queue 320 may store a 2-tuple 605 containing an input stream number and time stamp ($t_{timestamp}$) corresponding to each block of data received at controller 305. The input stream number indicates a system stream identifier $\{1, 2, \ldots, R\}$ for a stream of data blocks received at a system input circuit 105 corresponding to the system stream identifier. The time stamp indicates the time at which a data block of the data stream was received at a system output circuit 115.

Exemplary Data Block Input Processing

Figure 7:
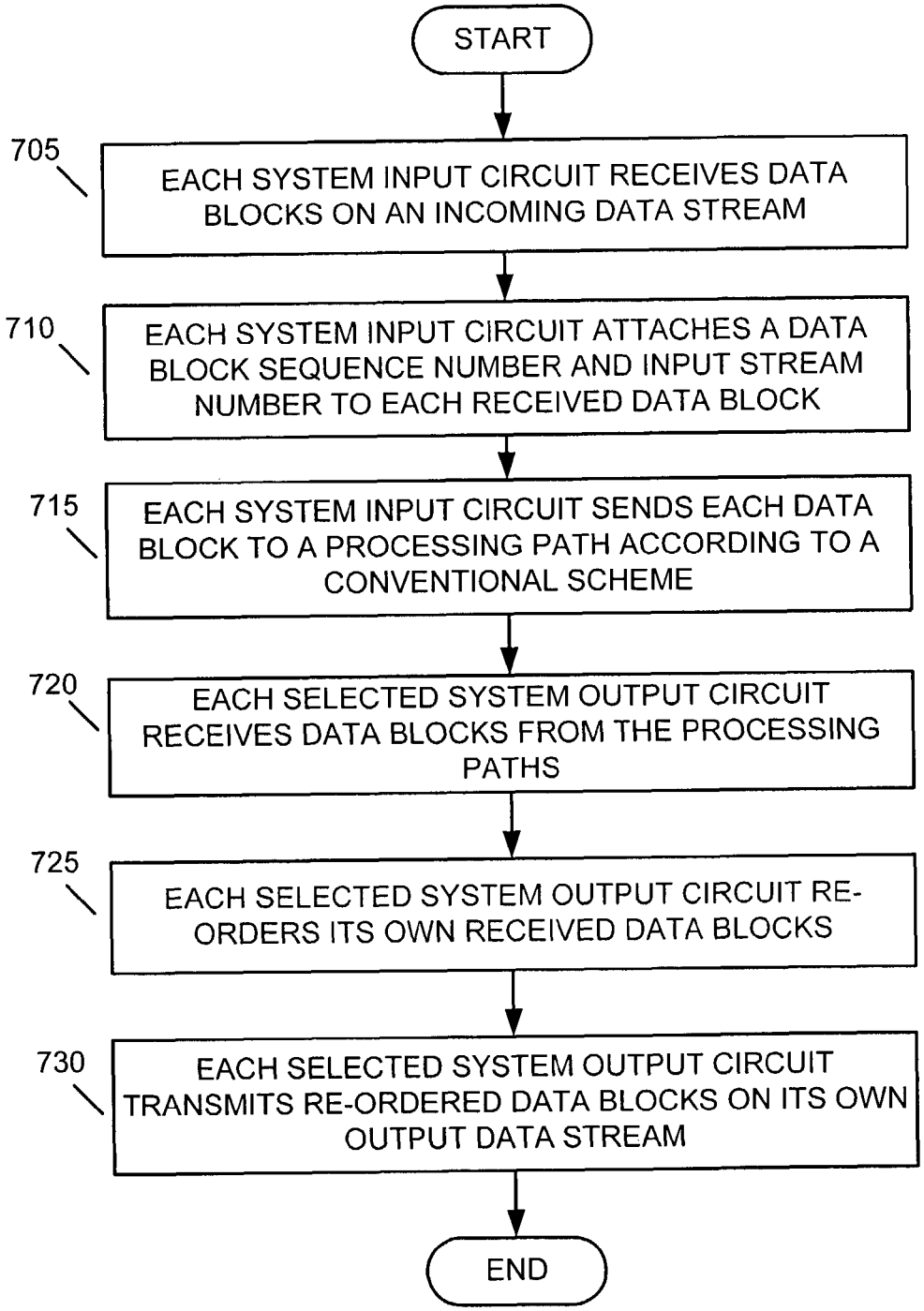
FIG. 7 is an exemplary flowchart of processing by the system input circuits of FIG. 1 according to an implementation consistent with the present invention.

FIG. 7 is an exemplary flowchart of processing by the system input circuits 105 of data processing system 100 according to an implementation consistent with the present invention. Processing may begin with each system input circuit 105 receiving data blocks on incoming data streams [step 705]. For example, input circuit 105a may receive a data stream that includes data blocks $AC^1$ and $AA^3$, where data block $AC^1$ is a first data block intended for system output circuit 115c and $AA^3$ is a third data block intended for system output circuit 115a. Each system input circuit 105 may attach (e.g., append, prepend, transmit out-of-band along with, or attach by other means) a data block sequence number and an input stream number to each received data block [step 710]. For example, a system input circuit 105 may attach a sequence number "seq_no. y" and an input stream number "inputstreamnumber_i" to each received data block. The data block sequence number attached to each block of data, if expressed in binary, may include a number of bits (seqbits) sufficient to address the maximum number of data blocks (max_dblk) that can possibly get ahead of any particular block of data. This maximum number of data blocks (max_dblk) may be equal to a value maxd divided by a known time taken by processing paths 110 to process the smallest received block of data. The number of bits in the sequence number may be sufficient to address the next power of two larger than this maxd value. The value maxd represents the maximum differential delay among the n processing paths 110.

Each system input circuit 105 may then send each received data block across one of the n processing paths 110 according to a conventional scheme [step 715]. For example, each system input circuit 105 may transmit each received data block according to a scheme that balances the load across each of the n processing paths 110. Importantly, each system input circuit 105 does not need to have information about the destination of a data block before selecting a processing path on which to send that data block. The determination of which of the S system output circuits 115 will be the destination of the data block is performed by one of the n processing paths 110 (the one to which the input circuit sends the data block). The selected system output circuit 115 may receive each data block subsequent to its processing by one of the n processing paths 110 [step 720]. Each selected system output circuit 115 may then re-order the received data blocks using order-restoring processes consistent with the present invention, such as, for example, the exemplary process described with regard to FIGS. 8-9 below [step 725]. Each selected system output circuit 115 may then transmit the re-ordered data blocks on its own output data stream [step 730].

Exemplary Processing for Restoring Data Block Order

Figure 8:
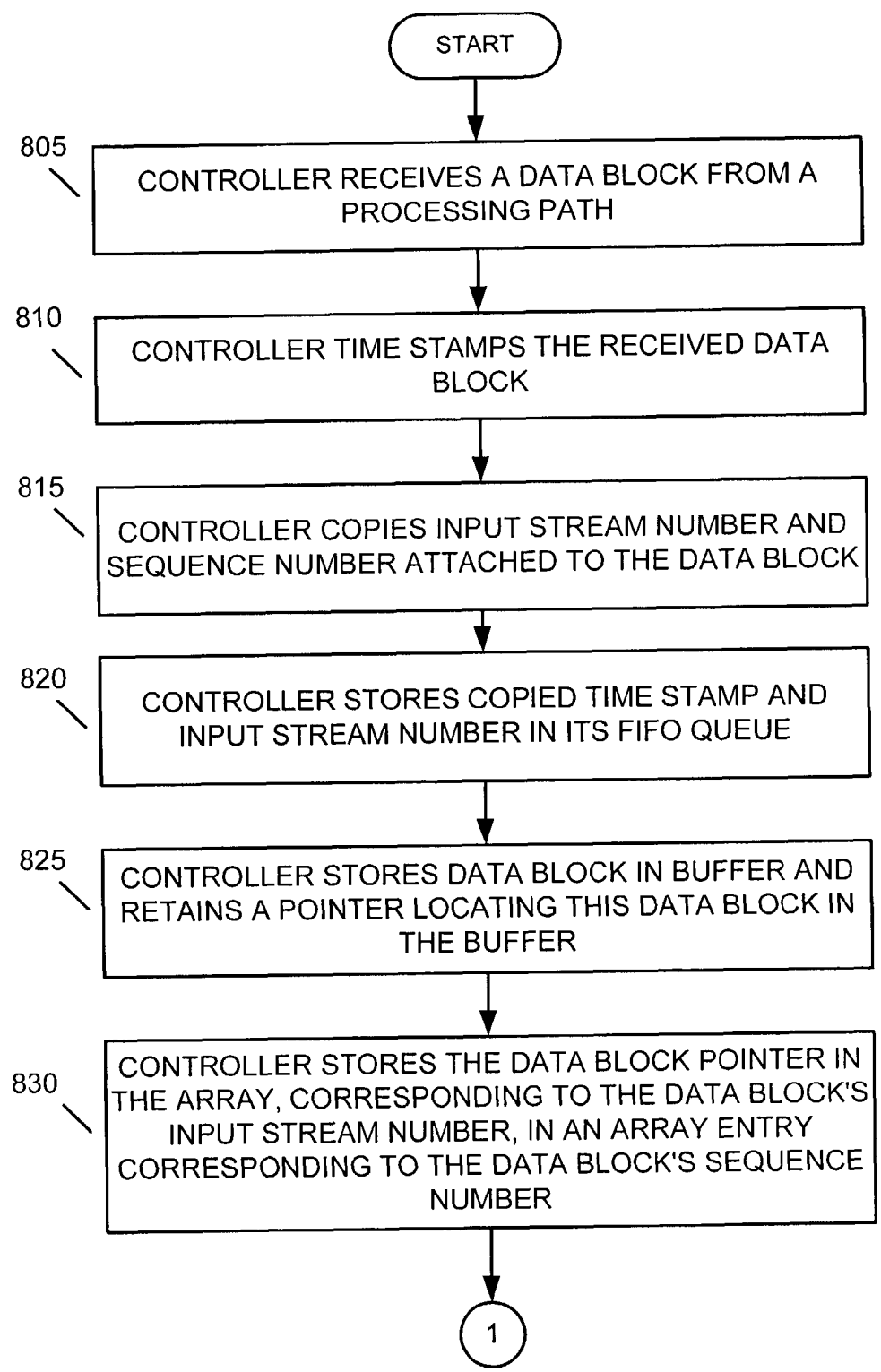
FIGS. 8-9 are exemplary flowcharts of processing by a system output circuit of FIG. 1 according to an implementation consistent with the present invention.
Figure 9:
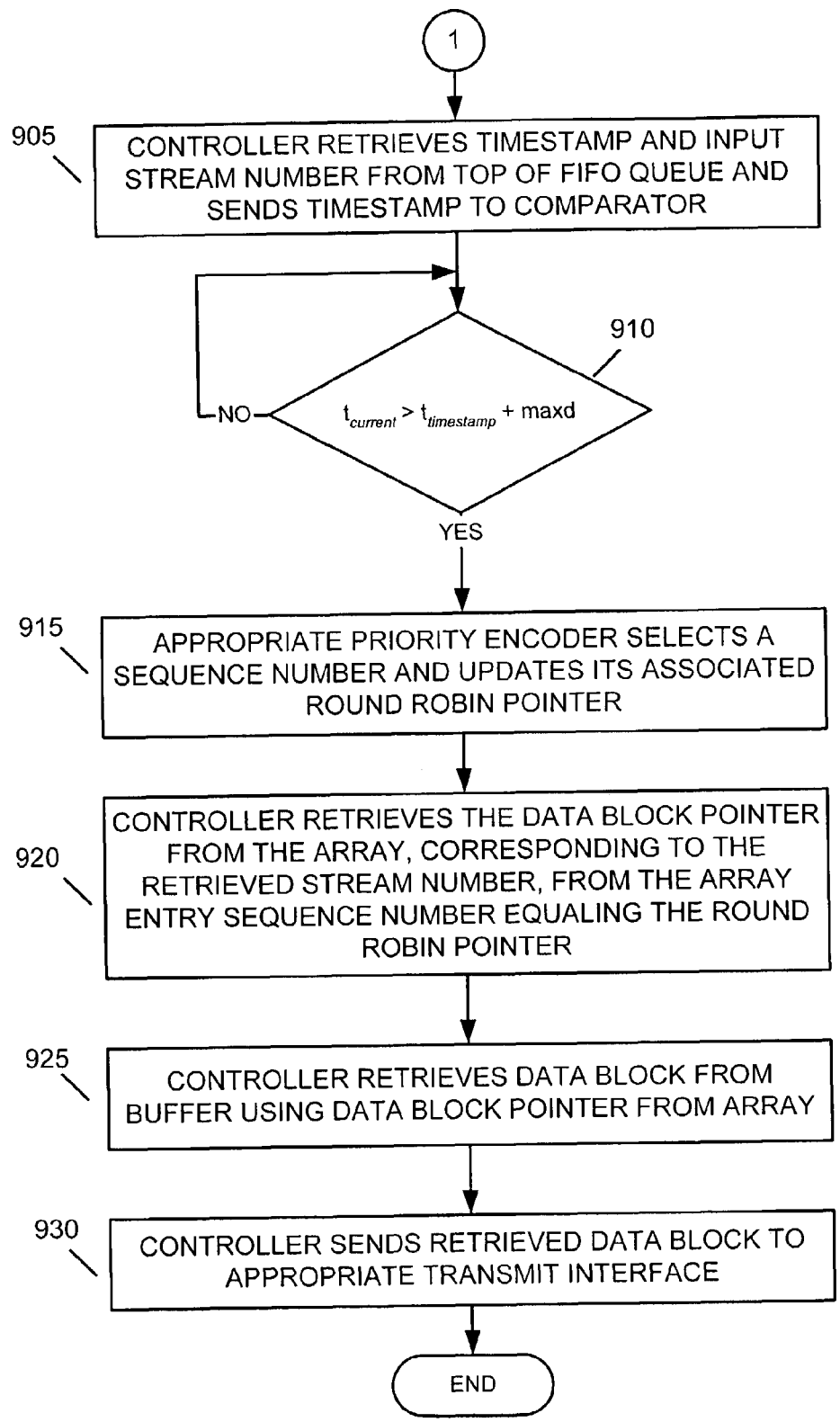

FIGS. 8-9 are exemplary flowcharts of processing for restoring the order of blocks of data processed by n processing paths 110, and received at each system output circuit 115, according to an implementation consistent with the present invention. The exemplary processing of FIGS. 8-9 may be implemented at each system output circuit 115 of system 100.

To begin processing, controller 305 may receive a data block from a processing path of processing paths 110 [step 805](FIG. 8). For example, controller 305 may sequentially receive the following data blocks: $AA^3$ $AA^2$ $CA^1$ $AA^1$. Controller 305 may retrieve a current time from clock 325 and time stamp $t_{timestamp}$ the received block of data [step 810]. Controller 305 may further copy the input stream number (e.g., inputstreamnumber_i) and sequence number (e.g., seq_no_y) attached to each data block by a system input circuit 105 [step 815]. Controller 305 may store the copied time stamp and input stream number as a 2-tuple 605 in its FIFO queue 320 in the order that the associated data block was received [act 820]. Controller 305 may then store the received data block in buffer 315 and retain a data block pointer locating this block of data in the buffer [act 825]. Controller 305 may further store the retained data block pointer in the array corresponding to the data block's input stream number, in an array 505 entry corresponding to the data block's sequence number [step 830].

Controller 305 may periodically retrieve the next time stamp ($t_{timestamp}$) and stream number 2-tuple 505 from the front of FIFO queue 320 and may send the time stamp to comparator 330 [act 905](FIG. 9). Comparator 330 may compare a current time $t_{current}$, received from clock 325, with the received time stamp $t_{timestamp}$ to determine if $t_{current}$ is greater than the sum of $t_{timestamp}$ and maxd [act 910]:

$$t_{current} > t_{timestamp} + \text{max}d \qquad \text{Eqn. (1)}$$

If $t_{current}$ is greater than the sum of $t_{timestamp}$ and maxd, then comparator 330 signals an appropriate priority encoder of priority encoders 410 to select the smallest sequence number present in its corresponding array in a round-robin sense and update its associated round robin pointer 515 with the selected sequence number [act 915]. For example, the appropriate priority encoder 410 may select sequence numbers in the following round-robin sequence: {SEQ. NO. x, SEQ. NO. x+1, . . . , SEQ. NO. x+K−1}. Controller 305 may then retrieve the data block pointer from the array, corresponding to the retrieved stream number, from the array entry sequence number equaling the round robin pointer [act 920]. For example, if the 2-tuple 605 retrieved from FIFO queue 320 contains inputstreammumber_1 and priority encoder 410 selects a sequence number equaling the base sequence number plus a value such as 3 (base_seq_x+3), then controller 305 retrieves data block pointer db_pointer_AA$^{x+3}$ from array 1 505a. Controller 305 then may retrieve a data block from buffer 315 using the data block pointer retrieved from the selected array 505 [act 925]. Controller 820 may then send the retrieved data block to the transmit interface(s) (not shown) for transmission [act 930].

CONCLUSION

Systems and methods, consistent with the present invention, provide mechanisms for preserving the order of blocks of data transmitted across n processing paths through the selective queuing and dequeuing of the data blocks based on a determined maximum differential delay among each of the n processing paths.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while series of steps have been described with regard to FIGS. 7-9, the order of the steps may differ in other implementations consistent with the present invention.

The scope of the invention is defined by the claims and their equivalents.

What is claimed is:

1. A method for preserving the order of blocks of data in a plurality of data streams transmitted across a plurality of processing paths, the method comprising:
   receiving, by a device, the blocks of data on the plurality of data streams;
   attaching sequence numbers to the received blocks of data without reference to an output destination;
   distributing, by the device, the blocks of data to the plurality of processing paths;
   receiving, by the device, the blocks of data processed by the plurality of processing paths;
   storing, by the device, each of the processed blocks of data in a location of a memory;
   storing, by the device, pointers, to each of the locations of the memory that stores a processed block of data, in a plurality of pointer queues based on the sequence numbers attached to each of the processed blocks of data;
   associating, by the device, a time stamp with each of the processed blocks of data;
   queuing, by the device, the time stamp associated with each of the processed blocks of data in a first-in first-out (FIFO) queue;
   successively retrieving the queued time stamps from the FIFO queue;
   retrieving, by the device and for each of the retrieved time stamps ($t_{timestamp}$), a pointer from the plurality of pointer queues when a current time ($t_{current}$) satisfies the relation:

$t_{current} > t_{timestamp} +$ the determined maximum differential processing time;

retrieving, by the device, a block of data, from the memory, using each of the retrieved pointers; and
   transmitting, by the device, each of the retrieved blocks of data.

2. The method of claim 1, further comprising:
   selecting a sequence number, from the attached sequence numbers, in a round-robin fashion; and
   retrieving a pointer from a selected one of the plurality of pointer queues based on the selected sequence number.

3. The method of claim 1, further comprising:
   attaching data stream numbers to the received blocks of data after receiving the blocks of data on the plurality of data streams,
   the pointers to each of the memory locations further being stored in a selected one of the plurality of pointer queues based on the data stream number attached to each of the processed blocks of data.

4. A data processing system, comprising:
   an input circuit to:
     receive data blocks on a plurality of data streams and distribute the data blocks, and
     attach sequence numbers to the received data blocks without reference to an output destination;
   a plurality of processing paths to receive and process the distributed data blocks; and
   an output circuit to:
     store each processed data block in a location of a memory;
     store pointers, to each of the locations of the memory storing a processed data block, in a plurality of pointer queues based on the sequence numbers attached to each of the processed blocks of data
     associate a time stamp with each of the processed data blocks;
     queue the time stamp associated with each of the processed data blocks in a first-in first-out (FIFO) queue;
     successively retrieve the queued time stamps from the FIFO queue;
     retrieve, for each of the retrieved time stamps ($t_{timestamp}$), a pointer from the plurality of pointer queues when a current time ($t_{current}$) satisfies the relation:

$t_{current} > t_{timestamp} +$ the determined maximum differential processing time;

retrieve a block of data from the memory using each of the retrieved pointers; and
     transmit each of the retrieved data blocks.

5. A method for preserving the order of blocks of data in a plurality of data streams processed by a plurality of processing paths, comprising:
   receiving the blocks of data on the plurality of data streams;
   attaching sequence numbers to the received blocks of data without reference to an output destination;
   distributing the blocks of data to the plurality of processing paths;
   processing, by the plurality of processing paths, the blocks of data;
   storing each of the processed blocks of data in a location of a memory;
   storing pointers, to each of the locations of the memory storing a processed block of data, in a plurality of pointer queues based on the sequence numbers attached to each of the processed blocks of data;
   associating a time stamp with each of the processed blocks of data queuing the time stamp associated with each of the processed blocks of data in a first-in first-out (FIFO) queue;
   successively retrieving the queued time stamps from the FIFO queue;

retrieving, for each of the retrieved time stamps ($t_{timestamp}$), a pointer from the plurality of pointer queues when a current time ($t_{current}$) satisfies the relation:

$t_{current} > t_{timestamp}$+the determined maximum differential processing time;

retrieving a block of data from the memory using each of the retrieved pointers; and transmitting each of the retrieved blocks of data.

6. The method of claim 5, further comprising:
selecting a sequence number, from the attached sequence numbers, in a round-robin fashion; and
retrieving a pointer from a selected one of the plurality of pointer queues based on the selected sequence number.

7. The method of claim 5, further comprising:
attaching data stream numbers to the processed blocks of data,
the pointers to each memory location being further stored in a selected one of the plurality of pointer queues based on the data stream number attached to each processed block of data.

8. A method for preserving the order of data blocks in data streams processed by a plurality of processing paths, comprising:
receiving the data blocks on the plurality of data streams, the data blocks arriving in a first order;
attaching sequence numbers to the data blocks received on the plurality of data streams without reference to an output destination;
distributing the data blocks to the plurality of processing paths;
processing, by the plurality of processing paths, the data blocks;
receiving the processed data blocks from the plurality of processing paths, the data blocks arriving in a second order;
storing each processed data block in a location of a memory;
storing pointers, to each location of the memory storing a data block, in a plurality of pointer queues based on the sequence numbers attached to each data block;
associating a time stamp with each of the data blocks;
queuing the time stamp associated with each of the data blocks in a first-in first-out (FIFO) queue;
successively retrieving queued time stamps from the FIFO queue; and
retrieving, for each retrieved time stamp ($t_{timestamp}$), a pointer from a selected one of the plurality of pointer queues when a current time ($t_{current}$) satisfies the relation:

$t_{current} > t_{timestamp}$+the maximum differential delay time among the plurality of processing paths;

retrieving a data block from the memory using each of the retrieved pointers; and
transmitting each of the retrieved data blocks.

9. The method of claim 8, further comprising:
selecting a sequence number, from the attached sequence numbers, in a round-robin fashion; and retrieving a pointer from a selected one of the plurality of pointer queues based on the selected sequence number.

10. The method of claim 8, further comprising:
attaching data stream numbers to the data blocks received on the plurality of data streams,
the pointers to each memory location being further stored in a selected one of the plurality of pointer queues based on the data stream number attached to each data block.

11. A method for preserving the order of packets in a plurality of data streams received at a data processing system, comprising:
receiving the blocks of data on the plurality of data streams, the blocks of data being received in a first order;
attaching sequence numbers to each of the blocks of data received on the plurality of data streams without reference to an output destination;
distributing the blocks of data to a plurality of processing paths;
processing, on each of the plurality of processing paths, the blocks of data;
receiving the blocks of data from the plurality of processing paths, the blocks of data being received in a second order;
storing each of the processed blocks of data in a location of a memory;
storing pointers, to each location of the memory storing a processed block of data, in a plurality of pointer queues based on the sequence numbers attached to each of the processed blocks of data
associating a time stamp with each of the processed blocks of data;
queuing the time stamp associated with each of the processed blocks of data in a first-in first-out (FIFO) queue;
successively retrieving the queued time stamps from the FIFO queue;
retrieving, for each retrieved time stamp ($t_{timestamp}$), a pointer from a selected one of the plurality of pointer queues if a current time ($t_{current}$) satisfies the relation:

$t_{current} > t_{timestamp}$+the maximum differential delay among the plurality of processing paths;

retrieving blocks of data from the memory using each of the retrieved pointers; and
transmitting each of the retrieved blocks of data.

12. The method of claim 11, further comprising:
selecting a sequence number, from the attached sequence numbers, in a round-robin fashion; and
retrieving a pointer from a selected one of the plurality of pointer queues based on the selected sequence number.

13. The method of claim 11, further comprising:
attaching data stream numbers to each of the received blocks of data after receiving the blocks of data on the plurality of data streams,
the pointers to each memory location being further stored in a selected one of the plurality of pointer queues based on the data stream number attached to each processed block of data.

* * * * *

UNITED STATES PATENT AND TRADEMARK OFFICE
CERTIFICATE OF CORRECTION

| | | |
|---|---|---|
| PATENT NO. | : 7,953,094 B1 | |
| APPLICATION NO. | : 10/358274 | |
| DATED | : May 31, 2011 | |
| INVENTOR(S) | : Spencer Greene | |

It is certified that error appears in the above-identified patent and that said Letters Patent is hereby corrected as shown below:

Claim 4, column 8, line 29 should read: "each of the processed blocks of data;"
Claim 5, column 8, line 63 should read: "of data; queuing the time stamp associated with each of"
Claim 11, column 10, line 29 should read: "processed blocks of data;"

Signed and Sealed this
Nineteenth Day of July, 2011

David J. Kappos
*Director of the United States Patent and Trademark Office*